United States Patent [19]
Thome et al.

[11] 4,395,649
[45] Jul. 26, 1983

[54] LINEAR ELECTROMAGNETIC VIBRATOR

[75] Inventors: Ludwig Thome; Karl Wanner, both of Leinfelden-Echterdingen; Karlheinz Bretthauer, Clausthal, all of Fed. Rep. of Germany

[73] Assignee: Robert Bosch GmbH, Stuttgart, Fed. Rep. of Germany

[21] Appl. No.: 22,158

[22] Filed: Mar. 20, 1979

[30] Foreign Application Priority Data

Mar. 20, 1978 [DE] Fed. Rep. of Germany ....... 2812067

[51] Int. Cl.³ ........................................... H02K 33/00
[52] U.S. Cl. ....................................... 310/15; 310/24; 310/30; 310/35
[58] Field of Search .................. 310/15, 23, 24, 30, 310/34, 35

[56] References Cited
U.S. PATENT DOCUMENTS

| | | | |
|---|---|---|---|
| 2,003,647 | 6/1935 | Dillström | 310/27 |
| 3,119,940 | 1/1964 | Pettit et al. | 310/24 |
| 3,130,334 | 4/1964 | Nowak | 310/35 |
| 3,259,769 | 7/1966 | Stott | 310/30 X |
| 3,336,488 | 8/1967 | Scott | 310/24 |
| 3,431,477 | 3/1969 | Marinescu | 310/35 X |
| 3,500,079 | 3/1970 | Barthalon | 310/30 X |
| 3,542,495 | 11/1970 | Barthalon | 310/24 X |
| 4,179,630 | 12/1979 | Stuber | 310/30 X |

*Primary Examiner*—Donovan F. Duggan
*Attorney, Agent, or Firm*—Michael J. Striker

[57] ABSTRACT

An electrically driven linear vibrator has swing drive for vibrating troughs, jarring tables or the like comprises a stator with an exciter winding, an armature guided for linear movement in a direction transverse to the field produced by the stator and a pair of oppositely acting return springs forming together a swing drive, the vibration of which may be used to drive a device connected to the vibrator. The return springs may be constituted by metal springs, gas springs or a combination of both. The swing drive may be constructed as single-acting or double-acting drives. A diode may be connected with the electrical conductors leading to exciter winding so that at a line frequency of 50 Hz, an oscillation frequency of 100 Hz, 50 Hz or 25 Hz may be obtained. The vibrator may also be provided with a piston blower for cooling the windings of the stator.

31 Claims, 19 Drawing Figures

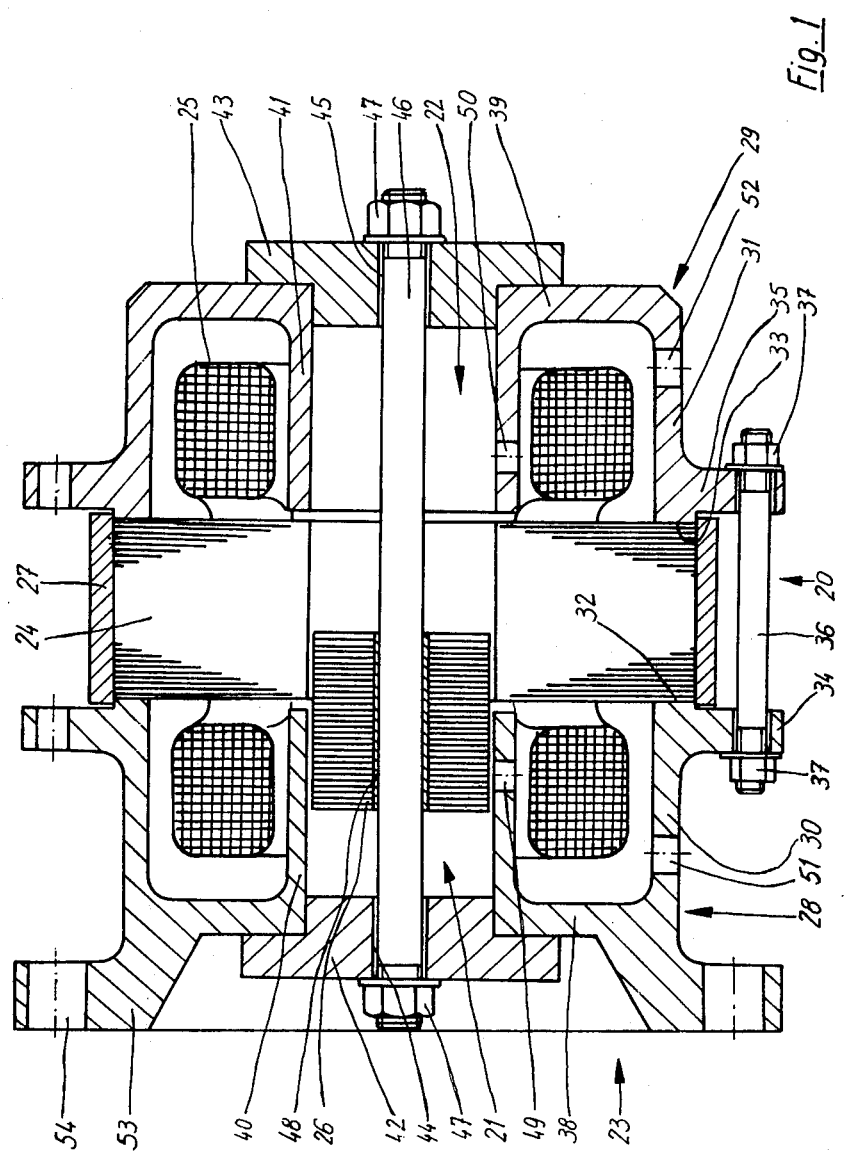

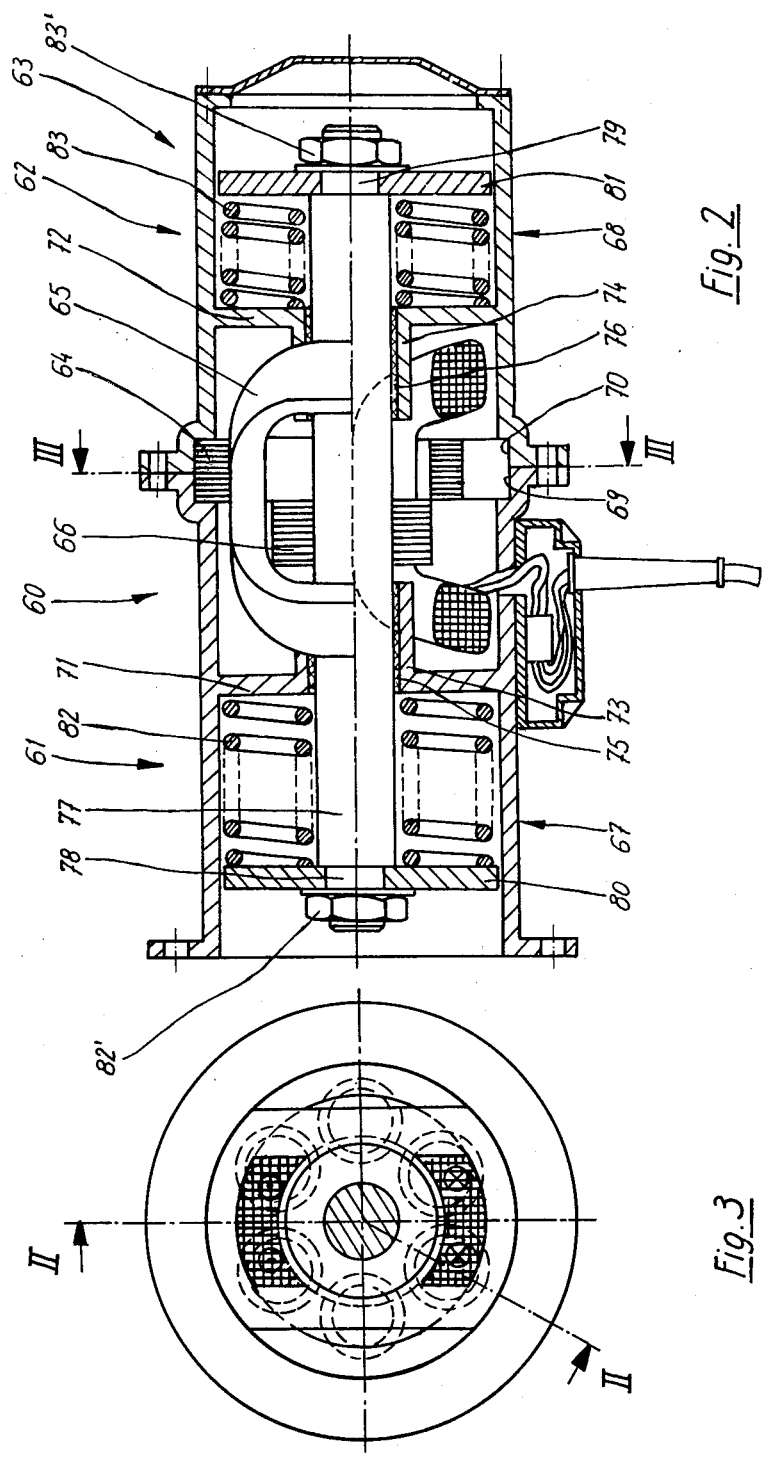

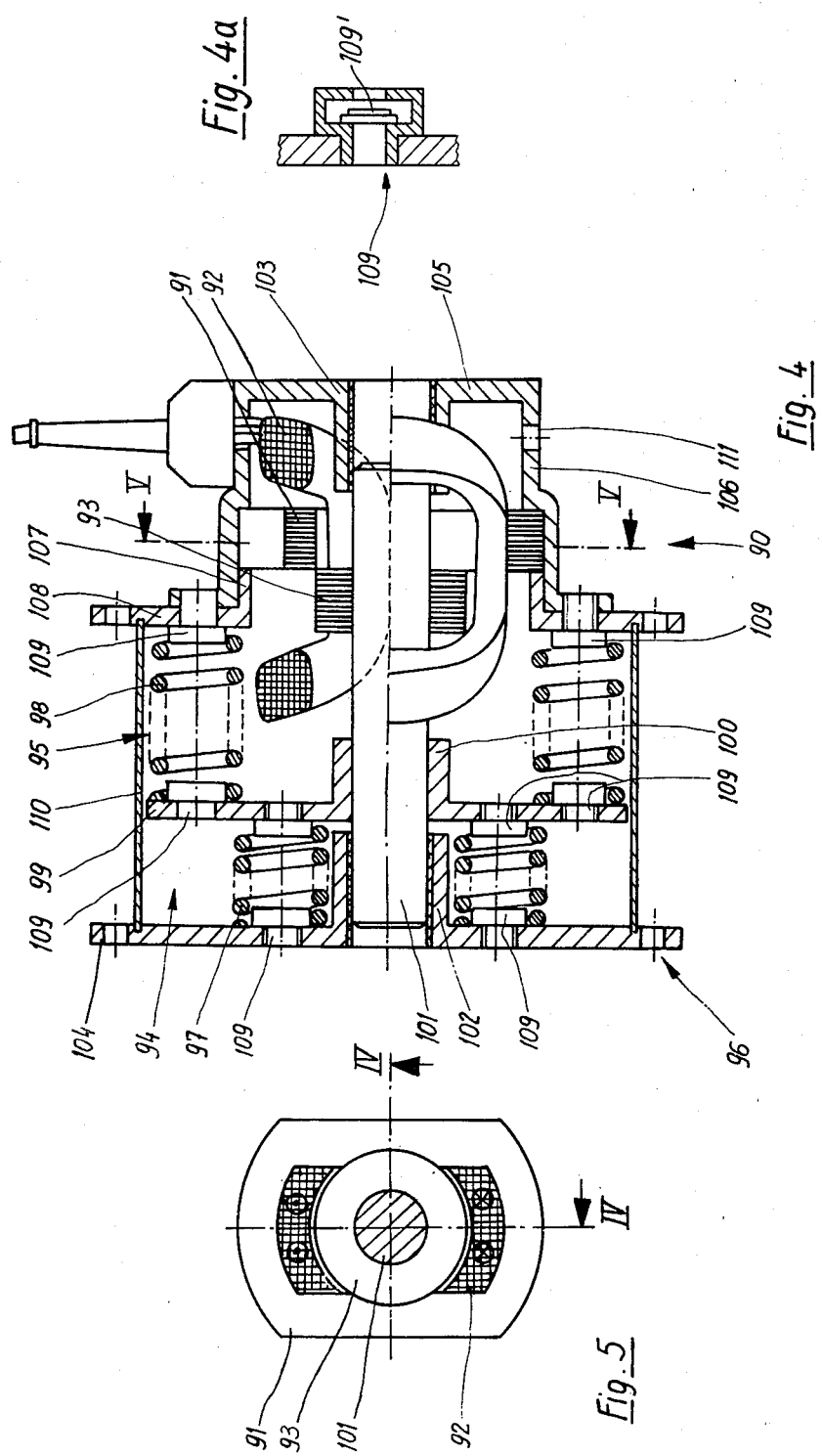

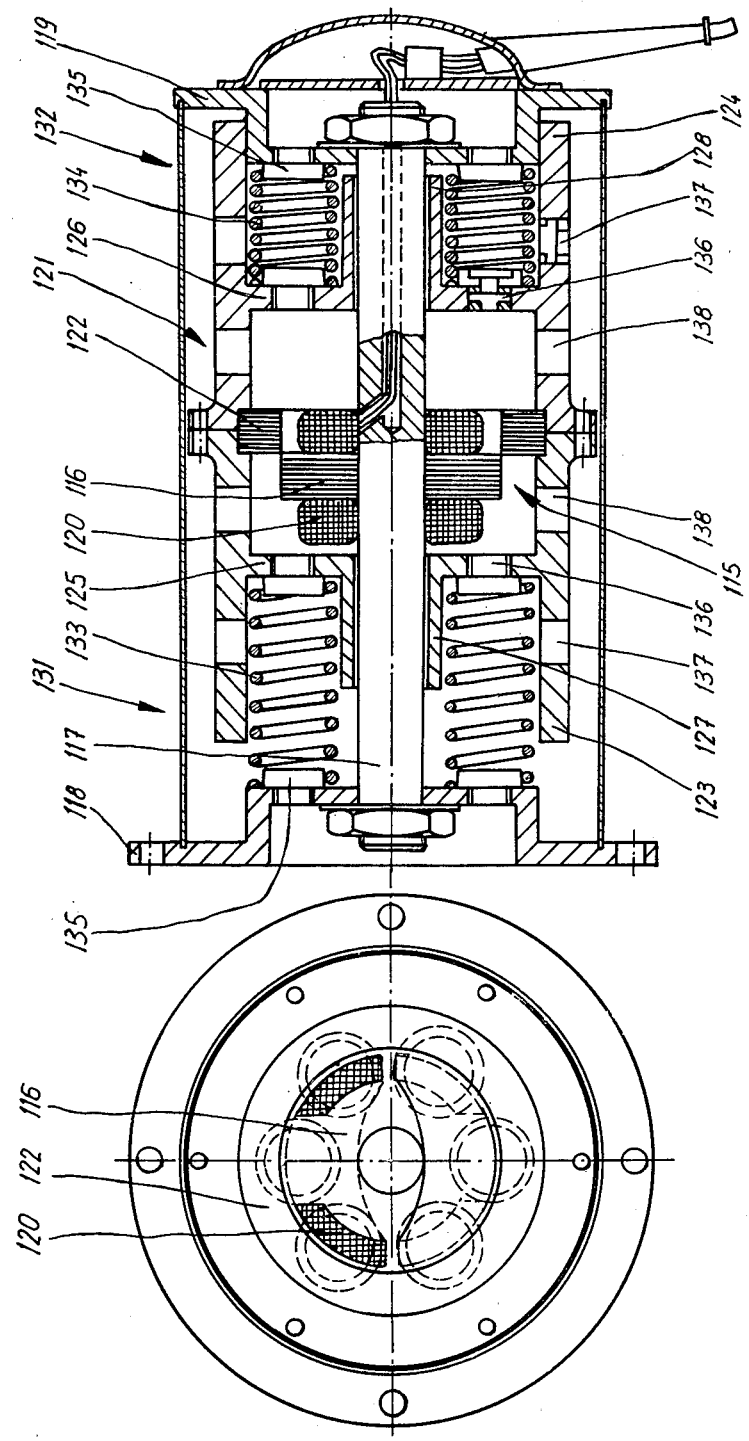

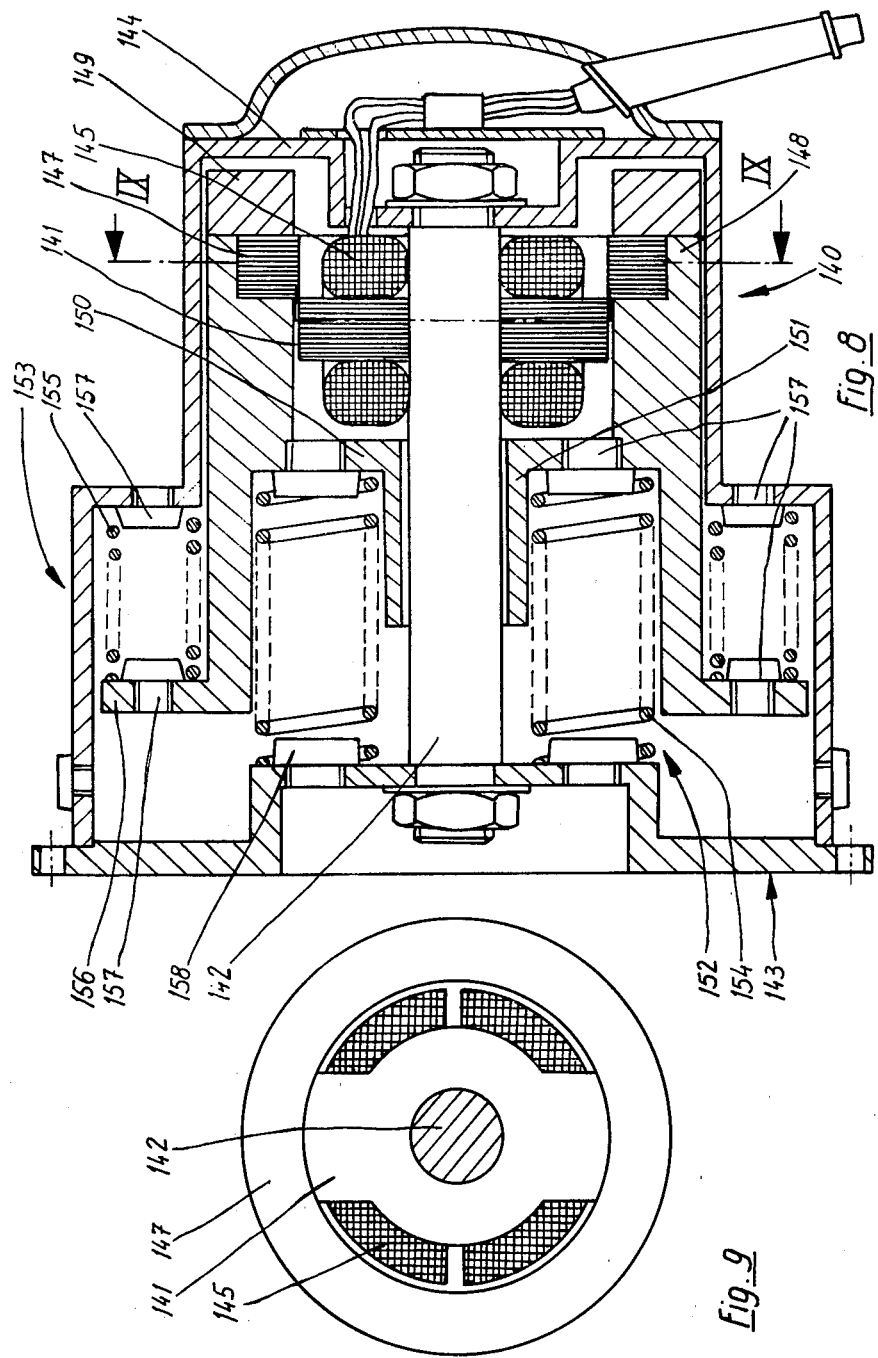

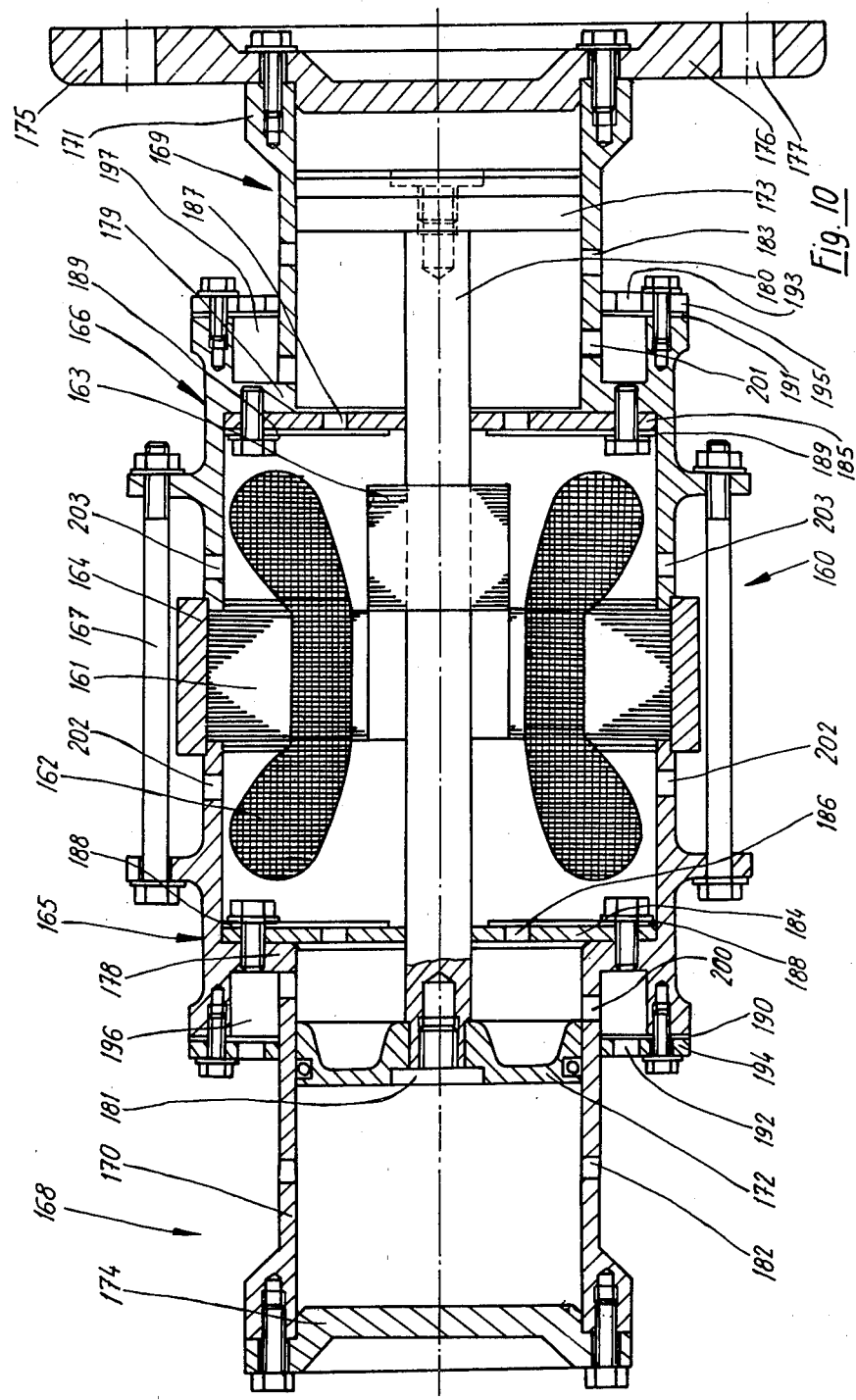

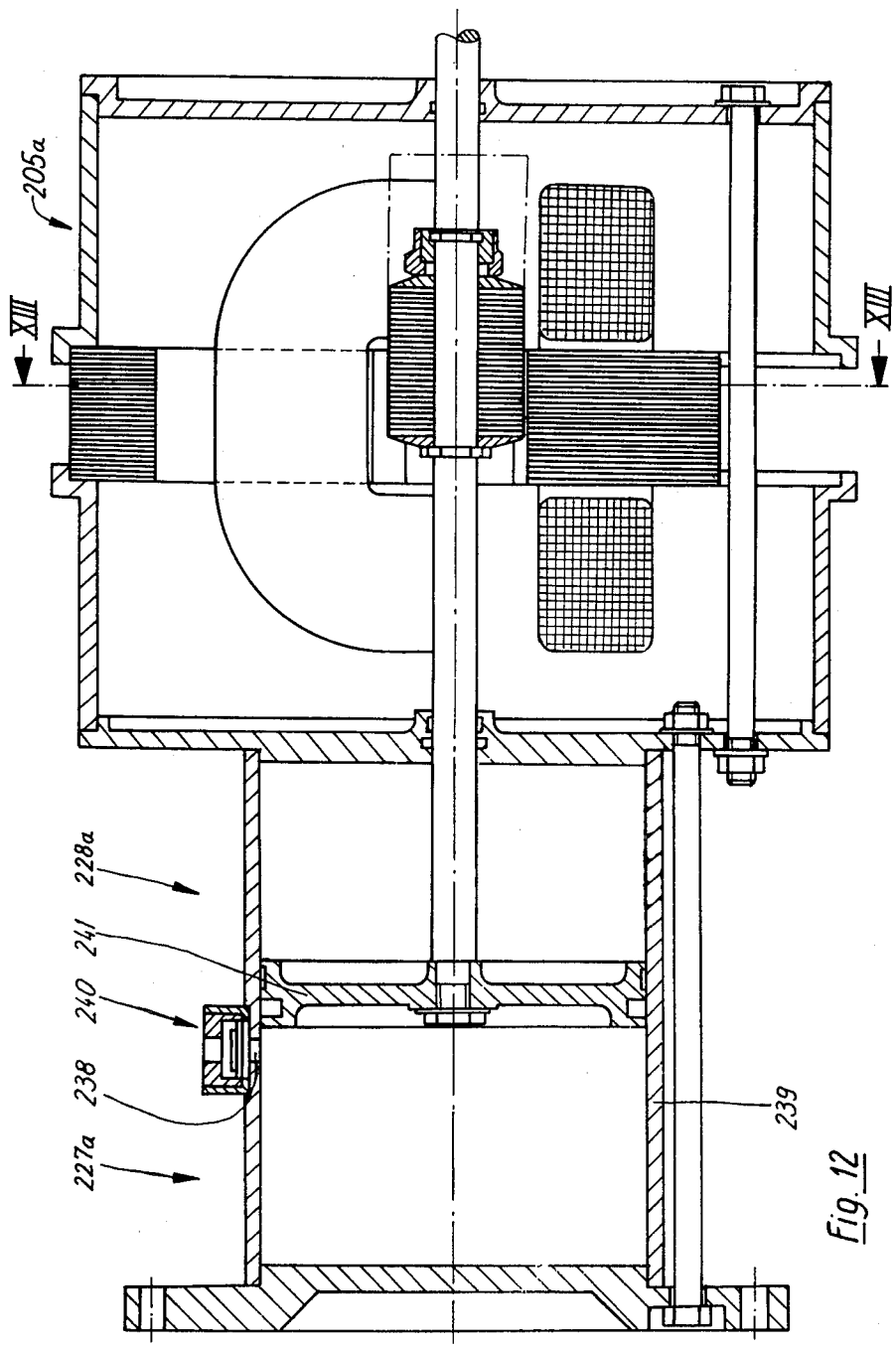

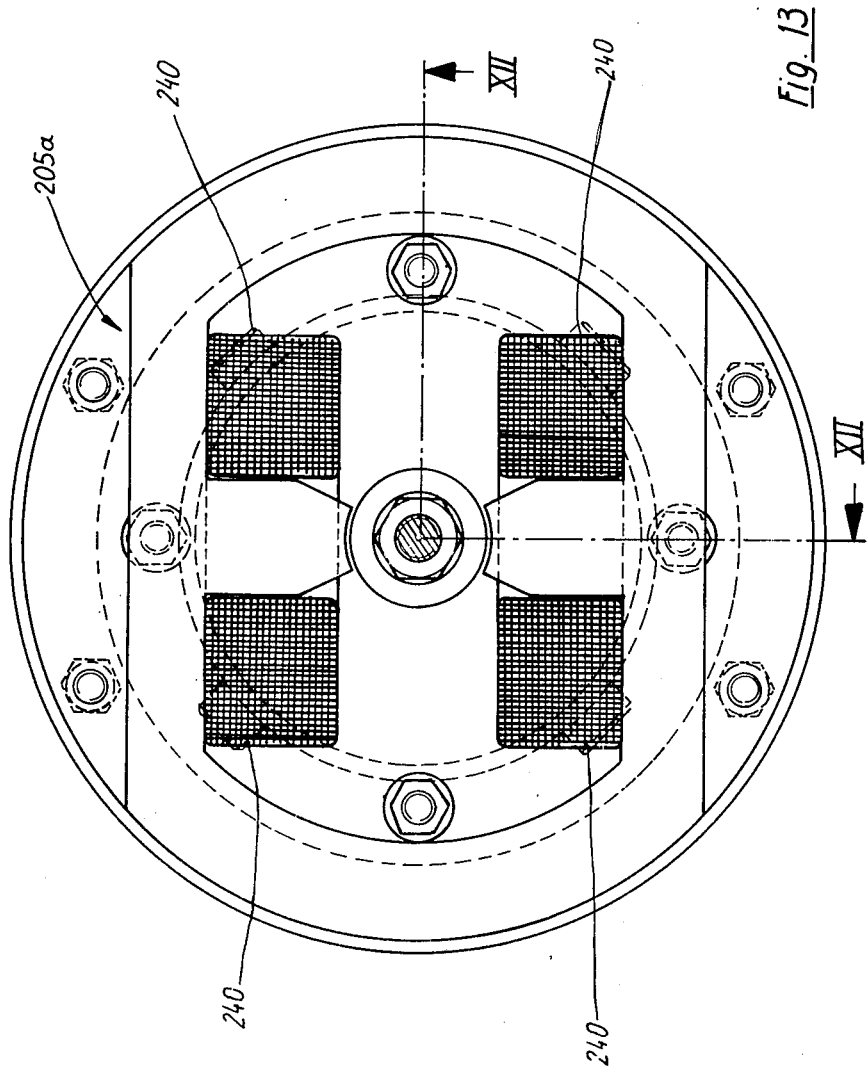

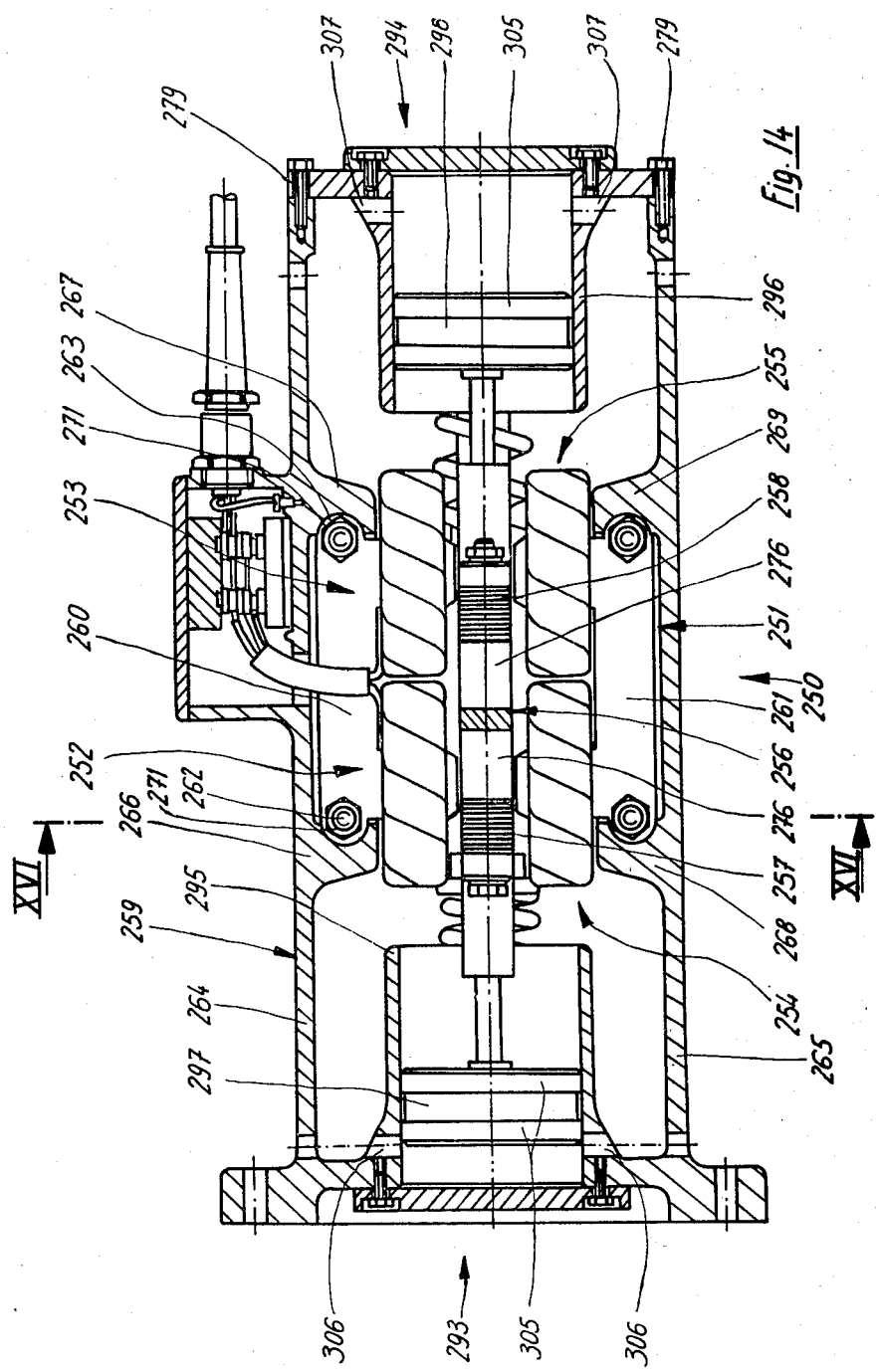

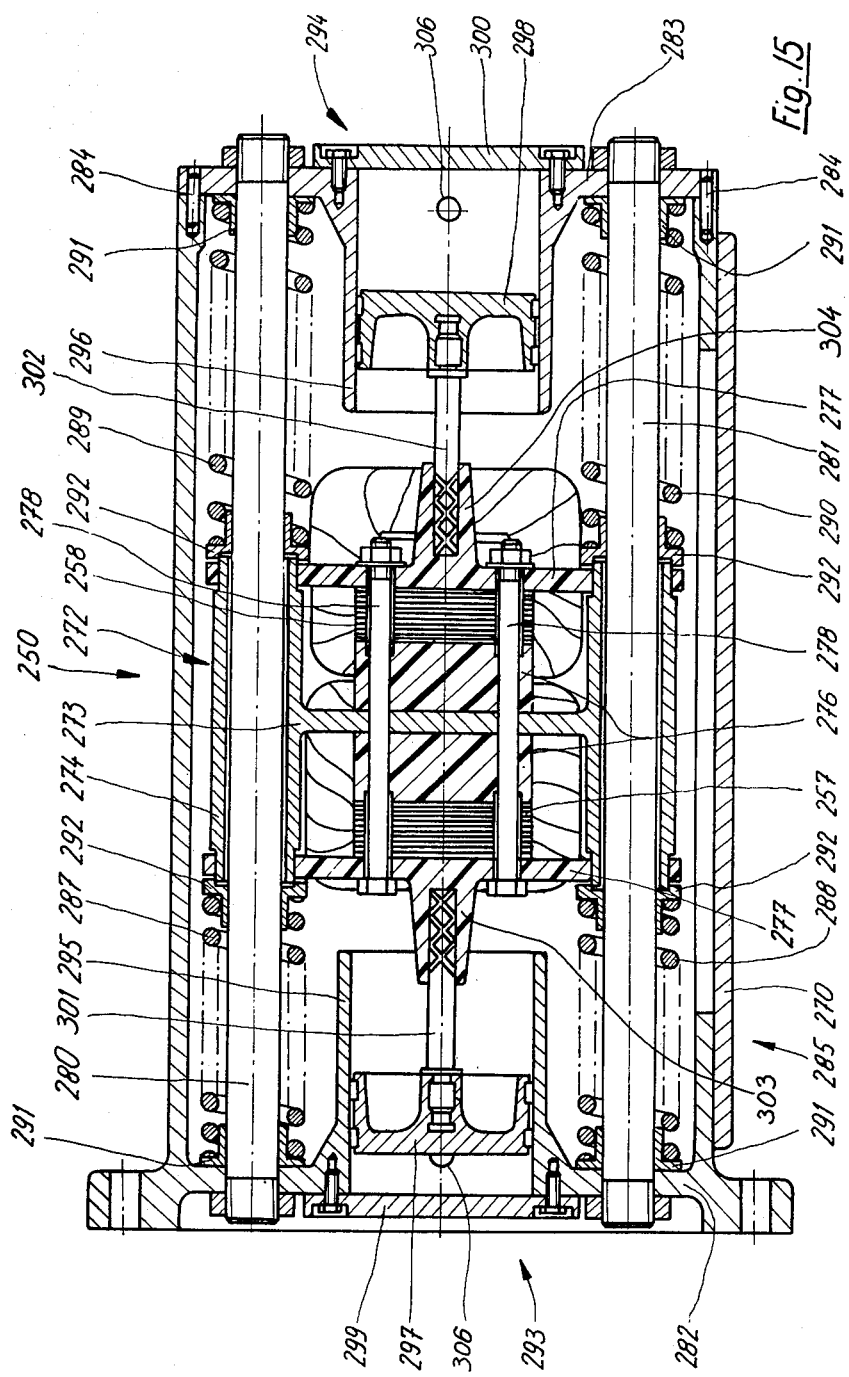

LINEAR ELECTROMAGNETIC VIBRATOR

BACKGROUND OF THE INVENTION

To loosen, convey or sieve loose material or for compacting of concrete in molds, apparatus performing a swinging motion are often used, as for instance swing conveyors, swinging sieves, respectively compacting vibrators. The necessary swinging motion is often produced by rotating unbalanced exciters. The unbalanced masses of such exciters are usually arranged in pairs, that is at each end of the shaft of the drive motor in order to avoid tumbling motions. For strictly linear vibrating motions two equal unbalanced masses must be driven in opposite direction synchronously in the same plane which requires special provisions for the synchronous movement. Such swing drives require a relatively large space and are constructed very heavily. In addition, the unbalanced forces are transmitted in their totality over the bearings onto the device which requires correspondingly large dimensioned and expensive bearings.

Besides such unbalanced exciters there exist also electromagnetic linear vibrators as swing drives. In these known electromagnetic linear vibrators the armature swings in the longitudinal direction of a pulsating magnetic field back and forth, whereby, shortly before impinging onto one pole shoe of the stator, it is intercepted by a spring and thrown back until it is intercepted by the oppositely acting second spring to be again accelerated in the direction toward the stator. If the armature moves in the direction of the line of magnetic flux, the air gap is shortened while the pulling force is at the start of the movement very small and at the end of the stroke considerably larger and, therefore, the armature can only carry out very small strokes in the order of about 1 millimeter. For this reason the mass of the armature has to be chosen considerably large, which results in large and heavy vibrators. In addition, the springs must be constructed very strong and stiff. This can be obtained only with metal springs. This in turn will result in a harmonic swinging motion. While a harmonic swinging motion is suitable for some applications, as for instance reciprocating feeders, in other applications, as for instance loosening or compacting material, motions with larger accelerations are better suitable. For this purpose the known linear vibrators are less suitable.

SUMMARY OF THE INVENTION

It is an object of the present invention to provide a linear electromagnetic vibrator which avoids the disadvantages of such vibrators known in the art.

It is a further object of the present invention to provide a linear electromagnetic vibrator in which the armature may perform a greater stroke than in such linear vibrators known in the art so that the mass of the armature may correspondingly be reduced and the whole vibrator drive may be constructed smaller and lighter than in such vibrators known in the art.

With these and other objects in view, which will become apparent as the description proceeds, the linear electromagnetic vibrator mainly comprises a stator having a pair of spaced poles, a winding for the stator producing, when energized, a magnetic field extending in a first direction, an armature guided for linear movement in a direction transverse to the first direction to be moved upon exitation of the winding away from a rest position, and a pair of springs acting in opposite direction on the armature for exerting at least in the end regions of the movement of the armature away from its rest position, a force to the latter in a direction towards the rest position.

The length of the stator in the aforementioned transverse direction is substantially equal to the length of the armature, which permits especially by the use of gas springs or by a combination of metal springs and gas springs to adapt the swinging motion of the vibrator to the different requirement of use. The return springs may be in the form of metal springs, gas springs or a combination of both.

If the springs are metal springs, they are preferably in the form of coil compression springs and the length of such coil compression springs is harmonized with the stroke of the armature so that the springs are stressed in each position of the armature, which will prevent that the ends of the metal springs become disengaged from the adjacent element to be subsequently abutted again thereon which would lead to a premature destruction of these springs.

If gas springs are used, such gas springs comprise a cylinder member closed at one end and a piston member guided in the cylinder member in which one of the members is connected to the armature for movement therewith. This construction permits to adapt a swinging motion for various uses since with a large piston diameter a swinging motion is derived which approaches a harmonic swinging motion, whereas with a smaller piston diameter a greater acceleration may be obtained.

At least one of the aforementioned cylinder members may be provided in the peripheral walls thereof with at least one opening located in a plane normal to the axis of the cylinder member and in which the opening is just closed by the piston member when the armature is in its rest position. This construction will assure that during return movement of the piston member the opening in the cylinder wall will be cleared when the piston passes its rest position so that the piston during its further return movement acts as a suction pump to suck air into the cylinder member from the surrounding atmosphere, so that such air will mix with the air in the interior of the cylinder to provide thus a cooling of the latter. During the return movement of the piston up to its middle position part of this air volume is again exhausted through the opening.

The aforementioned opening in the peripheral wall of at least one of the cylinder members may also be located in such a position that pressurizing of the gas spring may be obtained before the armature reaches its middle position, or that the spring action of the gas spring occurs only after the piston has carried out a relatively large stroke.

The aforementioned opening in the peripheral wall is preferably provided with a one-way valve which opens in inward direction and the peripheral wall may also be provided with a second opening in which a one-way valve is located which opens in outward direction and a gas conduit leading from the second opening close to the winding of the stator may be provided which will result in a proper cooling of the stator winding.

The two return springs may also be arranged at the same side of the stator, which leads to a shortening of the length of the vibrator.

The springs may be constructed and arranged so that both are stressed to the same degree when the armature is slightly displaced in the direction of its movement with respect to the stator, which will assure an easy starting of the vibrator.

The vibrator according to the present invention may also include a guide rod fixed to the stator on which the armature is mounted for movement in longitudinal direction of the guide rod.

According to a modified construction the armature may surround the stator and the winding thereof in which the stator has outwardly extending pole shoes, and in this construction a guide rod mounted in a housing surrounding the armature supports the stator, while the armature is axially guided in the guide rod. This construction permits to enlarge the mass of the armature without simultaneously increasing the dimensions of the stator.

The stator may also be provided with a second pair of pole shoes with its own winding coaxially arranged with and axially spaced from the first-mentioned pair of pole shoes for a distance which is greater than half the stroke of the armature and wherein the armature has two coaxial armature portions spaced from each other in the direction of movement of the armature through the same distance as the pair of pole shoes. This construction permits to double the force acting on the armature and therewith the acceleration of the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a longitudinal cross-section through a first embodiment of a linear electromagnetic vibrator according to the present invention;

FIG. 2 is a cross-section taken along the line II—II of FIG. 3 of a second embodiment;

FIG. 3 is a transverse cross-section taken along the line III—III of FIG. 2;

FIG. 4 is a cross-section taken along the line IV—IV of FIG. 5 of a third embodiment;

FIG. 4a illustrates a detail of the embodiment of FIG. 4 at an enlarged scale;

FIG. 5 is a transverse cross-section taken along the line V—V of FIG. 4;

FIG. 6 is a longitudinal cross-section of a fourth embodiment;

FIG. 7 is a partially sectioned end view of the embodiment shown in FIG. 6;

FIG. 8 is a longitudinal cross-section of a fifth embodiment;

FIG. 9 is a partial cross-section taken along a sixth embodiment;

FIG. 10 is a longitudinal cross-section through a sixth embodiment;

FIG. 12 is a cross-section taken along the line XII—XII of FIG. 13 of an eighth embodiment;

FIG. 13 is a transverse cross-section taken along line XIII—XIII of FIG. 12;

FIG. 14 is a vertical longitudinal cross-section through a ninth embodiment;

FIG. 15 is a horizontal cross-section of the embodiment shown in FIG. 14;

DESCRIPTION OF THE PREFERRED EMBODIMENTS

Figure 11:
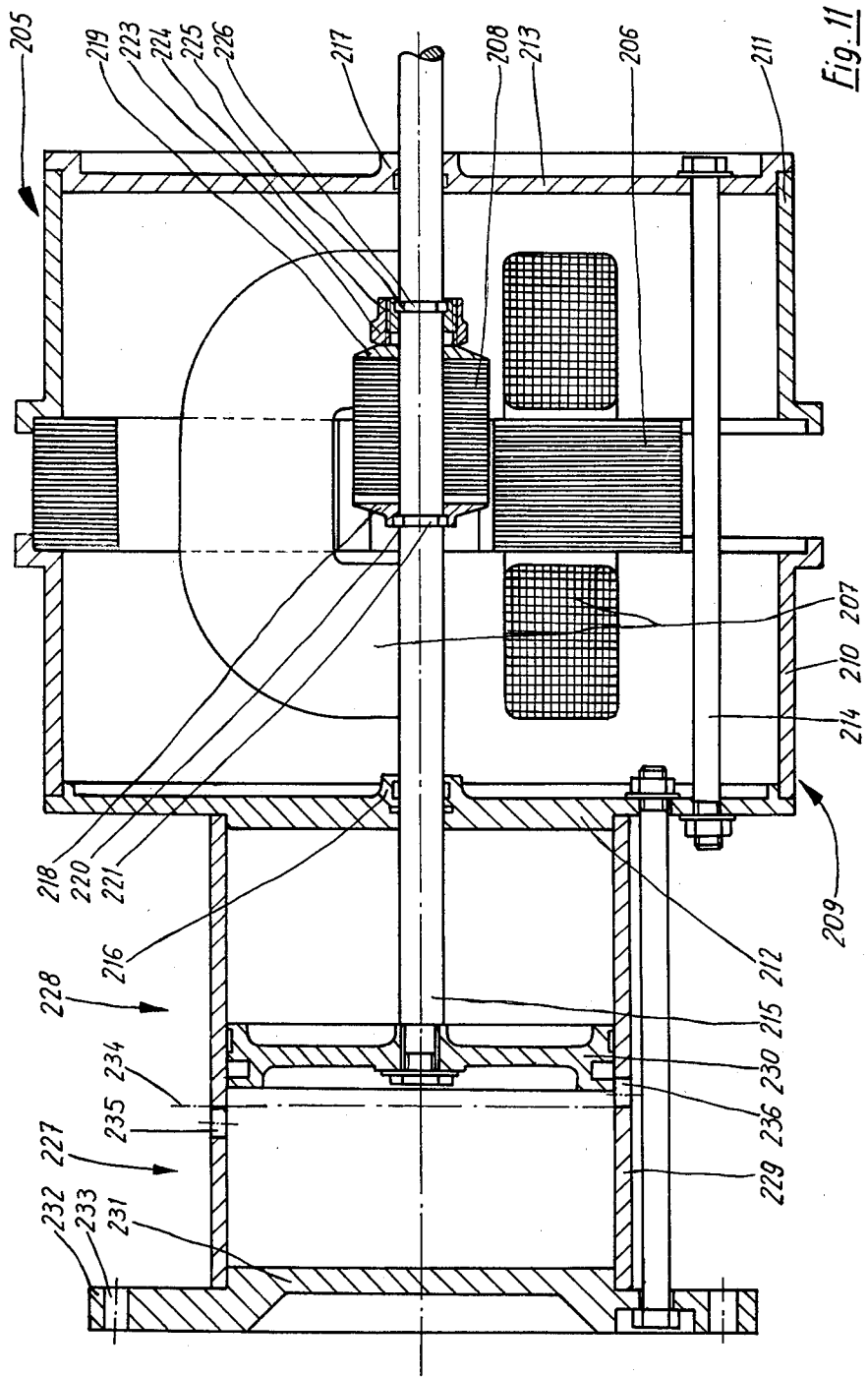
FIG. 11 is a longitudinal cross-section through a seventh embodiment.

The embodiment of the electromagnetic linear vibrator, called in the following for short vibrator, illustrated in FIG. 1 has a transverse field drive 20, two oppositely acting return springs 21 and 22, as well as a housing 23 in which the aforementioned elements are arranged.

The transverse field drive 20 comprises a stator 24 with a pair of poles, a two-part exciter winding 25 and an armature 26. The stator 24 is, as usual, constructed of sheet metal laminations. The side view of these laminations is similar to that shown in FIG. 13. The laminations of the stator 24 are combined to a stack of laminations and are radially outwardly surrounded and held in proper position by a holding ring 27. The housing 23 consists of two housing parts 28 and 29, each of which has a cylindrical wall 30, respectively 31, which at facing opposite ends are provided with planar abutment faces 32, respectively 33. These planar abutment faces 32 and 33 abut, radially inwardly of the holding ring 27, against the stack of laminations forming the stator 24. Each housing part 28 and 29 is further provided adjacent to the aforementioned abutment faces 32 and 33 with flanges 34, respectively 35. The flanges are provided with a plurality of circumferentially spaced bores therethrough, which are respectively aligned in the opposite flanges with each other. Bolts 36 extend through the bores and nuts 37 are screwed onto the opposite threaded ends of the bolts 36. By means of the bolts 36 and the nuts 37 thereon the two housing parts 28 and 29 are pulled toward each other to thereby clamp the stator 24 tightly therebetween.

Annular end disks 38, respectively 39, extend radially inwardly from the ends of the walls 30 and 31 which face away from each other. Axially extending cylinders 40, respectively 41, project from the inner ends of the annular disks 30 and 38 into close proximity of the stator 24. The two cylinders 40 and 41 have the same inner diameters and are aligned along a common axis. A pair of circular covers 42, respectively 43, are fitted into the ends of the cylinders 40 and 41 which face away from the stator 24. Each of the covers 42 and 43 is provided with a central bore 44, respectively 45, and opposite ends of a guide rod 46 of circular cross-section are tightly received in these bores. The ends of the guide rod 46 are provided with screw threads and project respectively beyond the covers 42 and 43. Nuts 47 are screwed onto the threaded opposite ends of the guide rod 46 to thereby press the covers 42 and 43 against the housing 23. The armature 26 is guided on the guide rod 46 for movement in axial direction of the latter. The armature 26 is constructed of annular laminations which are connected to each other to a stack, for instance by cementing. A glide sleeve 48 is tightly inserted into an axial bore of the armature 26 and the wall of the glide sleeve 48 is formed from a material or lined with a material of a low friction coefficient.

The interior diameter of the two cylinders 40 and 41 and the outside diameter of the armature 26 are correlated to each other in such a manner that the armature during penetration in one of the cylinders 40 or 41 closes the same as tightly as possible, without actually engaging the inner surface thereof. The two cylinders 40 and 41 form therefore with the armature 26 two gas springs and these gas springs form the return springs 21 and 22 for the armature 26.

Each of the cylinders 40 and 41 is provided in its peripheral wall with an opening 49, respectively 50. These openings are located in a plane normal to the axis of the cylinder, which is located between the rest position of the edge of the armature 26 facing the respective cylinder and the outer reversing point of this edge which is located closer to the cover 42, respectively 43. These openings 49 and 50 form control openings for the respective gas spring. The position of these openings in axial direction determines the point in the movement of the armature 26 in which this armature together with the cylinder 40 or 41 starts to act as a gas spring. The spring characteristic of the gas spring serving as return springs 21 and 22 for the armature 26 depends essentially on the position of the openings 49 and 50. In that region of the stroke of the armature 26 which is located between the entrance of the piston edge into the cylinders 40 and 41 and the closing of the corresponding openings 49, respectively 50, the armature 26 acts as a blower piston. During its movement towards the stator 24 air is sucked into the cylinder 40, respectively 41, which intermingles with the air which is already located in the respective cylinder to cool the latter. During its reverse movement, part of the air is again pushed out through the opening 49 or 50. This air will thereby cool part of the windings 25 located outside the cylinders 40 and 41 to subsequently escape through the openings 51, respectively 52, in the cylindrical wall 30 or 31 of the housing part 28 or 29.

As shown in FIG. 1, the left housing part 28 is also provided at its outer end with an attachment flange 53, provided with a plurality of circumferentially displaced openings 54, through which screws may be passed to connect the vibrator to a device to which a swinging motion is to be imparted by the vibrator.

The armature 26 is illustrated in FIG. 1 in a position of its movement in which it extends partly in the left cylinder 40 to overlap and close thereby the opening 49. Since return spring 21 is thereby stressed, the armature 26 can assume such a position during the operation of the vibrator only in passing. The rest position of the armature 26 is located closer to the center between the two extreme positions in which the openings 49 and 50 are respectively closed by the armature 26.

In the following description of the operation of the vibrator illustrated in FIG. 1, it is assumed that the exciter winding 25 is connected over a diode to an alternating current voltage, usually to a 50 Hz net voltage. Upon energizing of the winding 25 the armature will be accelerated during the first half wave in the direction toward the stator 24. Since the diode suppresses the following half wave and since the armature 26 has already a certain kinetic energy, it moves beyond the position in which it is alinged with the stator 24 until it is intercepted by the opposite return spring to be thereby again accelerated in the opposite direction. In the meantime the stator 24 is again excited by the third half wave so that the armature is additionally accelerated in the direction toward the stator. The armature 26 moves thereby again beyond the position aligned with the stator until it is intercepted by the other return spring to be again accelerated in the opposite direction. Due to the interaction of accelerating the armature by the stator field and intercepting and return throw by the return spring, the vibrator will reach in short time its normal operating condition in which it is moved back and forth with a frequency of 25 Hz. The amplitude of movement of the armature will depend on the mass thereof and on the spring characteristics of the two return springs 21 and 22. Thereby the housing 23 together with the rigidly connected parts thereof will carry out oppositely directed vibrations which, by means of the attachment flange 53, is transmitted to a device connected thereto. This cross-field drive in which the armature is alternately accelerated in opposite directions of movement by the stator field is in the following designated as double acting.

The constructive details and operating characteristics of the other embodiments of the vibrator according to the present invention are subsequently described only insofar as they deviate from the first embodiment above described.

The vibrator illustrated in FIGS. 2 and 3 has a transverse field drive 60, two oppositely acting return springs 61 and 62, as well as a housing 63 in which the aforementioned parts are arranged.

The transverse field drive 60 comprises a stator 64 having a two-part exciter winding 65 and the armature 66. As can be seen from FIG. 3, or even better from the similar FIG. 5, the stator 64 is constructed without specific poles. The laminations of the stator 64 are held in place solely by the housing 63. This housing 63 comprises two housing parts 67 and 68 which have at the facing ends thereof each a cylindrical enlargement 69, respectively 70, which in assembled condition form an annular groove in which the stator 64 is received and clamped. Due to the absence of specific poles in the stator 64, and the therefrom resulting very compact construction of the transverse field drive 60, there is in the region of movement of the armature 66 no space for the winding heads of the exciter winding 65. The winding heads must, therefore, be guided from one side to the other outside the path of movement of the armature 66. As especially evident from the lower half of FIG. 2, the winding head at the right side of the two parts of the exciter winding 65 is located closely adjacent to the stator 64, whereas the winding head at the left side is with a larger spacing placed about the stator 64. From this results that the transverse field drive 60 in this embodiment will be single acting, in which the armature 66 is accelerated only in one direction, and in the embodiment of FIG. 2 from the left towards the right accelerated by the stator field up to a position in which the armature 66 is substantially aligned with the stator 64. The return stroke of the armature 66 is provided in this embodiment exclusively by the return springs and especially by the return spring 61.

Planar annular supporting walls 71 and 72 are provided respectively substantially at the centers of the axial extensions of the cylinders formed by the housing part 67 and 68. Connected to the inner edge of each supporting wall 71 and 72 are a pair of tubular guide parts 73, respectively 74, which extend toward the stator 64. These guide parts 73 and 74 are provided at the inner surface thereof with a layer 75, respectively 76, having a low friction coefficient or appropriate glide sleeves may be set into these guide parts.

The armature 66 is constructed of annular laminations which are connected to each other by cementing to a sheet metal stack. The armature 66 is provided with a central bore through which a guide rod 77 of circular cross-section extends. The guide rod 77 is preferably constructed from non-magnetic material of low electrical conductivity in order to hold the eddy current losses as small as possible. The outer diameter of the guide rod 77 is correlated to the inner diameter of the guide parts 73 and 74 to form a running fit. The armature 66 is mounted on the guide rod 77 with a press fit so as to move with the latter in axial direction. The guide rod 77 extends to opposite sides through the guide parts 73 and 74 and through a certain distance beyond the latter. The guide rod 77 is provided at opposite ends with cylindrical portions 78, respectively 79, of reduced diameter which in turn are provided at the outer ends with screw threads. A pair of annular disks 80, respectively 81, are mounted on the portions 78 and 79 of the guide rod and fixedly connected to the guide rod by nuts 82, respectively 83. The disks 80 and 81 serve as outer spring plates for the return springs 61 and 62. Each of the return springs 61 and 62 comprises a set of six coil compression springs 82, respectively 83, which are arranged circumferentially spaced uniformly from each other in the annular space between the guide rod 77 and the cylindrical wall of the housing part 67, respectively 68. The inner spring plates are formed by the supporting walls 71 and 72 of the housing parts 67 and 68. The axial dimensions of the coil compression springs 82 and 83 and the axial distance of their spring plates 80 and 71, respectively 81 and 72, are correlated to the total stroke of the armature 66 in such a manner that in each position of the armature remains a certain minimum tension in the springs so that the latter will not be lifted from the spring plates. In view of the single-acting traverse field drive 60, the two return springs 61 and 62 and the parts coordinated therewith are arranged in such a manner that the position of equilibrium of the two return springs is at least substantially at the center between the position of the armature 66 in which it is aligned with the stator 64 and the left return position of the armature 66 which is illustrated in FIG. 2. The right return position of the armature 66 coincides substantially with the position of the armature when the latter is aligned with the stator. Due to this construction of the vibrator the armature 66 is attracted by the stator 64 of each half wave of the alternating voltage applied and in the region of zero voltage between the half wave retracted by the return spring 61. At the absence of a diode and at a net voltage of 50 Hz and a corresponding selection of the dimensions of the armature 66 and the parts moving therewith and a corresponding dimensioning of the return springs 61 and 62, this vibrator will perform a swinging movement of a frequency of 100 Hz. If a diode is used and the swing system is adjusted in a different manner, the vibrator will oscillate with a frequency of 50 Hz.

In the embodiment illustrated in FIGS. 4 and 5 the transverse field drives 90 with the stator 91 and the exciter winding 92 and the armature 93 are constructed in the manner as described in connection with the embodiment shown in FIGS. 2 and 3. The return springs 94 and 95 are, however, both arranged at the same side of the stator 91. In this way the multi-part housing 96 can be constructed essentially shorter than shown in the embodiment illustrated in FIG. 2. The return springs 94 and 95 are again constructed as spring sets of a plurality of circumferentially displaced coil compression springs 97, respectively 98. An annular disk 99 serves as spring plate adjacent to the armature for both return springs 94 and 95. The spring plate 99 has a hub 100 by means of which the disk 99 is connected for instance by a press fit, or by a set screw, not shown in the drawing, to the guide rod 101 for the armature 93. The guide rod 101 is guided at its right end, as viewed in FIG. 4, in a cylindrical guide portion 103 projecting inwardly from an end wall 105 of the substantially cylindrical housing part 106, which in an inwardly located annular enlargement receives also the stator 91. The stator 91 is held in this enlargement by a cylindrical extension 107 of a second housing part 108. The planar annular housing part 108 serves also as spring plate for the coil compression springs 98 of the return spring 95. The housing part 104 which carries the guide part 102 serves in the same manner as a spring plate for the coil compression springs 97 of the return spring 94. Guide plugs 109 are provided in the spring plates 99, 104 and 108 for properly holding and guiding the individual coil compression springs 97 and 98 of the two return springs 94 and 95. A tubular housing part 110 is clamped between the disk-shaped housing parts 104 and 108. If the disk 99, which by means of the guide rods 108 is coupled to the armature 93, extends with its outer periphery closely adjacent to the inner periphery of the housing part 110, then the disk 99 forms the piston of a cylinder formed by the housing part 110. If in addition the guide plugs 109 provided in the housing part 104 and in the spring plate 99 are formed with openings therethrough as shown in FIG. 4a into which one-way valves 109 are set and which open from left towards the right, then the aforementioned parts act together as a piston blower which pumps a cooling air stream through the interior of the housing toward the stator 99 and to the exciter winding 92. As outlet for this cooling air serve openings 111 provided in the housing part 106 at the right side of the stator 91.

The embodiment illustrated in FIG. 4 will operate in the same manner as described above in connection with FIG. 2.

In the above-described embodiment the armature is located radially inwardly of the stator. This arrangement is reversed in the embodiment illustrated in FIGS. 6 and 7. In this embodiment the transverse field drive 115 comprises a stator 116 which is fixedly connected to a guide rod 117 which in turn is fixedly screwed to two housing parts 118 and 119. The exciter winding 120 is arranged at opposite sides of the stator 116. The armature 121 is constructed of several parts. The magnetic acting part of the armature 121 is formed by an armature ring 122, which is composed of annular laminations and which surround the stator 116 and the two-part exciter winding 120 in the manner as shown in FIG. 9, which in this respect coincides with the embodiment shown in FIGS. 6 and 7. The further parts of the armature 121 are constituted by two mass cylinders 123 and 124, which at the ends facing each other are each provided with a radially outwardly extending flange provided with openings therethrough for clamping the two cylinders 123 and 124 to each other by means of screws, not illustrated in the drawing, and extending through the aformentioned openings. The facing ends of the cylinders 123 and 124 are also provided with annular cutouts dimensioned in accordance with the axial extension of the armature ring 112 in such a manner that during clamping of the two cylinders, the armature ring 122 is clamped between the same. The two mass cylinders 123 and 124 are provided substantially midway of their longitudinal extension with inwardly extending planar annular walls 125, respectively 126, from the inner edtes of which tubular guide parts 127, respectively 128, project outwardly in axial direction. The inner surfaces of the guide parts 127 and 128 are either provided with layers of material of a low friction coefficient or corresponding glide sleeves are inserted into the guide parts 127 and 128. The inner diameter of the guide parts 127 and 128 is correlated to the outer diameter of the guide rod 127 to form a slide fit with the latter.

Each of the two return springs 131 and 132 are formed by a set of six coil compression springs 133, respectively 134. The housing part 118 and the wall 125 serve as opposite spring plates for the coil compression springs 133 arranged at the left side of FIG. 6. The housing part 119 and the wall 126 serve as spring plates for the coil compression springs 134 arranged at the right side of FIG. 6. Guide plugs 135 are arranged in the housing part 118 and in the housing part 119 to properly center the coil compression springs 133 and 134, respectively. The guide plugs 136 located in the wall 125 and the wall 126 are provided with an opening therethrough, in each of which a one-way valve is arranged which opens toward the stator 116. The cylinders 123 and 124 are provided in a section of the cylindrical walls thereof in which the return springs 131, respectively 132, are arranged with openings 137 into which one-way valves are set which open inwardly. Openings 138 are provided in the longitudinal section of the peripheral walls of the cylinders 123 and 124 in which the traverse field drive 115 is arranged. This system of openings with or without one-way valves permits the production of a directed air stream which passes from the outside of the armature 121 through the space between the mass cylinder 123 and the guide part 127, respectively between the mass cylinder 124 and the guide part 128 into the space in which the traverse field drive 115 is arranged and finally out of this space into the region surrounding the armature 121. This air stream is produced by two piston blowers. One of these piston blowers is formed by the mass cylinder 123 and that surface region of the housing part 118 which serves as the spring plate for the return spring 131 and which is piston-like bulged in the direction towards the mass cylinder 123. The other piston blower is formed by the mass cylinder 124 and that surface region of the housing part 119 which serves as spring plate for the return spring 132 and which is piston-like bulged towards the mass cylinder 124.

The supply conductors for the inwardly arranged exciter winding 120 is guided through a bore in a part of the guide rod 117 which extends from the right end thereof to the exciter winding.

The vibrator according to FIGS. 6 and 7 has a double-acting transverse field drive. Its swing characteristic is, therefore, similar to that of the vibrator shown in FIG. 1, with the difference that in this case, due to the rather large mass of the armature, the swinging amplitude is relatively small.

The vibrator illustrated in FIGS. 8 and 9 is in principle very similar to the above-described embodiment shown in FIGS. 6 and 7, with the difference that in the latter embodiment both return springs for the outer armature are again arranged at the same side of the stator so that certain parts of the housing and the outer armature are modified in the manner as already described in connection with the embodiment illustrated in FIGS. 4 and 5 in comparison with the embodiment shown in FIGS. 2 and 3.

The transverse field drive 140 is double acting. The stator 141 is fixedly mounted on a guide rod 142 which in turn is fixed to the two housing parts 143 and 144. The exciter winding 145 is arranged about the stator 141. The armature 146 which outwardly surrounds the stator 141 and the exciter winding 145 is composed of a plurality of parts and provided with a magnetic acting part in form of a closed armature ring 147 composed of a plurality of annular laminations. A further part of the armature 146 is formed by a mass cylinder 148 which is provided at the end face thereof with an annular cutout in which the armature ring 147 is located. The armature ring 147 is held in this cutout by a holding ring 149, which is pressed against the right end face of the mass cylinder 148 by screws, not illustrated in the drawing. The mass cylinder 148 is supported by a single planar annular carrying wall 150 provided at its inner end with a tubular guide part 151 which is slidably guided on the guide rod 142. Each of the two return springs 152 and 153 is formed by a set of a plurality of coil springs 154, respectively 155, which are circumferentially displaced from each other. The carrying wall 150 and a disk-shaped portion of the housing part 143 serve as spring plates for the return springs 152, whereas a flange 156 projecting radially outwardly from the left end of the mass cylinder 148 and an opposite disk-shaped portion of the housing part 144 serves as spring plates for the return springs 153. The spring plates are provided with guide plugs 157 and 158 for properly centering the springs and the guide plugs 157 are provided with one-way valves in order to pass a cooling air stream toward the traverse field drive 140, which air stream is sucked in and pumped by the disk-shaped parts of the armature which act as blower pistons, that is the carrier wall 150 and the flange 156.

The embodiment illustrated in FIG. 10 has a double-acting transverse field drive 160 with a stator 161 formed from laminations, a two-part exciter winding 162 and an armature 163 which is likewise built of laminations. The pack of stator laminations is in radial direction held by a holding ring 164 and in axial direction clamped between end faces of two mirror-symmetrically constructed, substantially cylindrical housing parts 165 and 166 which are pressed towards each other by screw bolts 167. The return springs 168 and 169 are constructed as gas springs. Each of the return springs 168 and 169 comprises a cylinder 170, respectively 171, as well as pistons 172, respectively 173, axially movable therein. The cylinders 170 and 171 are closed at the outer ends thereof by covers 174, respectively 175. The cover 175 is extended beyond the outer diameter of the cylinder 171 to form a connecting flange 176 which in the outer region is provided with a plurality of circumferentially displaced bores 177 therethrough. The gas spring cylinders 170 and 171 have smaller diameters than the corresponding cylindrical housing parts 165 and 166 integrally formed therewith. The connection between the cylinder 170 and the corresponding housing part 165 as well as the connection between the cylinder 171 and the corresponding housing part 166 are each formed by planar annular wall portions 178, respectively 179.

The gas spring pistons 172 and 173 are constructed as disk pistons. They are provided in the centers thereof with openings into which opposite ends of the guide rod 180 project to which they are connected by screws 181.

The guide rod 180 carries midway between the opposite end thereof the armature 163 for movement therewith in longitudinal direction. The pistons 172 and 173 thus serve as part of the guide for the armature. Both gas spring cylinders 170 and 171 are provided in the peripheral wall thereof with a plurality of openings 182, respectively 183, which are respectively located in that plane normal to the cylinder axes in which these openings are just closed by the respective pistons 172, respectively 173, when the armature 163 is in its rest position. The openings 182 and 183 thus determine start and end of the spring action of the two return springs 168 and 169, as was explained in connection with the embodiment illustrated in FIG. 4. Between the region of the stroke of the pistons 172 and 173 which is located between the afore-mentioned plane normal to the piston axis and the inner reversing point of the gas spring pistons, the openings 182 and 183 serve to exchange the air in which at first fresh air is sucked in and mixed with the air heated by the spring action so as to cool this air, whereafter part of the heated air is again expelled.

The gas spring pistons 172 and 173 serve also with the rear face thereof, which is directed toward the stator 161, as blower pistons which pump a pulsating cooling air stream into the interior of the housing parts 165 and 166. The gas spring cylinders 170 and 171 are for this purpose provided at their inner ends with valve plates 184, respectively 185, which are connected by screws to the wall parts 178, respectively 179, of the housing portions 165 and 166. The valve plates 184 and 185 are provided with a plurality of openings 186, respectively 187, therethrough which at their inner sides directed toward the stator 161 are closed by flexible valve tongues 188, respectively 189, which let air streams pass in inward direction, while preventing flow of air in the opposite direction. Besides these one-way valves which operate as pressure valves there are also provided one-way valves which are operated as suction valves. The latter are likewise provided with flexible valve tongues 190, respectively 191, and they close openings 192, respectively 193, at one side thereof which are provided in valve plates 194, respectively 195. These valves plates 194 and 195 close at one end annular spaces 196, respectively 197, which are formed by parts of the walls of the cylinders 170, respectively 171, by planar wall parts 178, respectively 179, and by cylindrical extensions 198, respectively 199, of the housing parts 165, respectively 166. A plurality of radial openings 200, respectively 201, respectively lead from the annular spaces 196 and 197 into the cylinders 170 and 171 of the piston blowers. The heated up cooling air may escape from the interior space in which the traverse field drive 160 is arranged through a plurality of radial bores 202, respectively 203, in the two housing parts 165 and 166 into the surrounding atmosphere.

The embodiments illustrated in FIG. 11 and in FIGS. 12 and 13 are modifications of the above-described embodiment shown in FIG. 10. They differ from the embodiment shown in FIG. 10 mainly in that the return springs are located at one side of the stator.

The embodiment shown in FIG. 11 has a transverse field drive 205, including a stator 206, with its two part exciter winding 207 and an armature 208, These elements are arranged in a cylindrical housing 209 which has a pair of tubular housing parts 210 and 211 as well as annular housing parts 212 and 213, which are held together by a plurality of screw bolts 214, while simultaneously clamping the stack of laminations of the stator 206 between facing end faces of the tubular housing parts 210 and 211. The armature 208 formed from annular laminations is mounted on the guide rod 215, which is guided in hub-shaped guide portions 216 and 217, respectively provided at the centers of the disk-shaped housing parts 212 and 213. The laminations of the armature 208 are loosely pushed onto the guide rod 215. A pair of end disks 218 and 219 are respectively provided at opposite ends of the stack of laminations forming the armature 208. The end disk 218 abuts against a retaining ring 220 provided in an annular groove 221 in the guide rod 215. The end disk 219 is pressed by a clamping device toward the end disk 218, which clamping device comprises a nut part 223 screwed onto a threaded inner annular part 224. The nut part 223 abuts against the end disk 219 and the inner annular screw part abuts against a second retaining ring located in a second annular groove 226 in the guide rod 215.

The two return springs 227 and 228 are constructed as gas springs. They have a common gas spring cylinder 229 which is fastened to the disk-shaped housing part 212. In addition they have a common gas spring piston 230 which is screwed onto that end of the guide rod 215 which projects into the gas spring cylinder 229. The gas spring cylinder 229 is closed at the end facing away from the housing 209 by a cover 231 which forms at the same time a connecting flange 232 with a plurality of openings 233 by means of which the vibrator may be connected to a device to be driven thereby.

The peripheral wall of the gas spring cylinder 229 is provided with two openings 235 and 236 which are respectively located to opposite sides of a plane indicated by the dash-dotted line 234, which extends normal to the axis of the cylinder substantially midway between opposite ends thereof. The two openings 235 and 236 are just closed by the gas spring piston 230 when its middle cross-section plane normal to the piston axis coincides with the dash-dotted line 234. In this position of the gas spring piston 230 the armature 208 is displaced through a slight distance from a position in which the position of the armature 208 coincides with that of the stator 206, which will assure a secure starting of the transverse field drive. During operation the gas spring piston 230 will act at the side thereof facing away from the dash-dotted line 234 as return spring 227 or 228, whereas the respective other side of the piston will operate as a gas exchange pump sucking fresh cooling air into the interior of the cylinder 229, respectively expelling the heated air mixture therefrom.

Figure 11A:
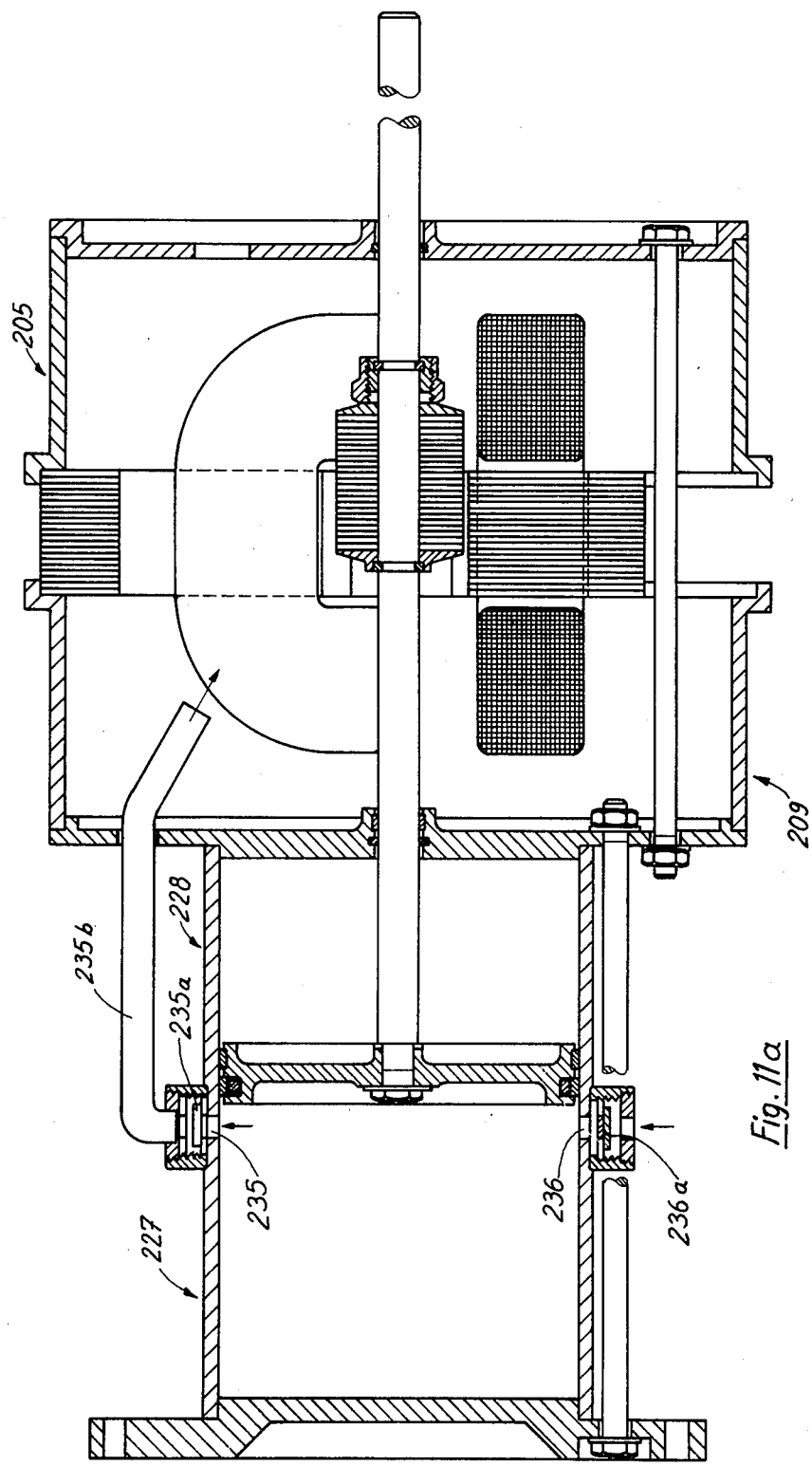
FIG. 11a illustrates a modification of the embodiment shown in FIG. 11.

In this embodiment, there is no piston blower provided for cooling the interior of the housing 209. If natural convection is not sufficient for cooling the transverse field drive 205, then it is possible to provide a piston blower at the side of the housing 209 which faces away from the cylinder 229 to be driven by an end of the guide rod 250 projecting beyond the end disk 213. Another possibility to provide a certain cooling air stream for the transverse field drive 205 would be to provide as shown in FIG. 11a in a certain number of openings 235 one-way valves 235a opening in outward direction and in some of the openings 236 one-way valves 236a opening in inward direction in the peripheral wall of the cylinder 229 and to connect to the outward opening one-way valves 235 gas conduits 235b, which would transmit the pulsating air stream passing through these valves into the interior of the housing 209.

The transverse field drive 205a of the embodiment illustrated in FIGS. 12 and 13 is exactly identical to the transverse field drive 205 described above in connection with the embodiment shown in FIG. 11, so that a further description seems not to be necessary. The elements forming the return springs 227a and 228a correspond also to the elements of the preceding embodiment, with the exception that in the embodiment shown in FIGS. 12 and 13 only openings 238 located in a plane normal to the cylinder axis and midway between the opposite ends thereof are provided in the peripheral wall of the gas spring cylinder 239 which is common to both return springs.

The openings 238 in the peripheral wall of the cylinder 239 are each provided with a one-way valve 240 and four of these one-way valves are indicated in FIG. 13. The one-way valves 240 are constructed that, during movement of the piston 241 from its middle position toward the two reversing points of the piston, air will be sucked into the expanding cylinder space on the respective piston side, whereas during the return movement of the piston this additionally sucked-in air cannot be expelled so that the cylinder spaces at opposite sides of the piston 241 work already as return springs at the moment the piston reverses its direction of movement. The return springs 227a and 228a operate, therefore, at a higher pressure level than in the embodiment illustrated in FIG. 11. Due to the cooperation of the two return springs during the total stroke of the armature, the resulting spring force curve approaches closer a linear course than is the case with the construction of the return springs according to FIG. 11.

Figure 16:
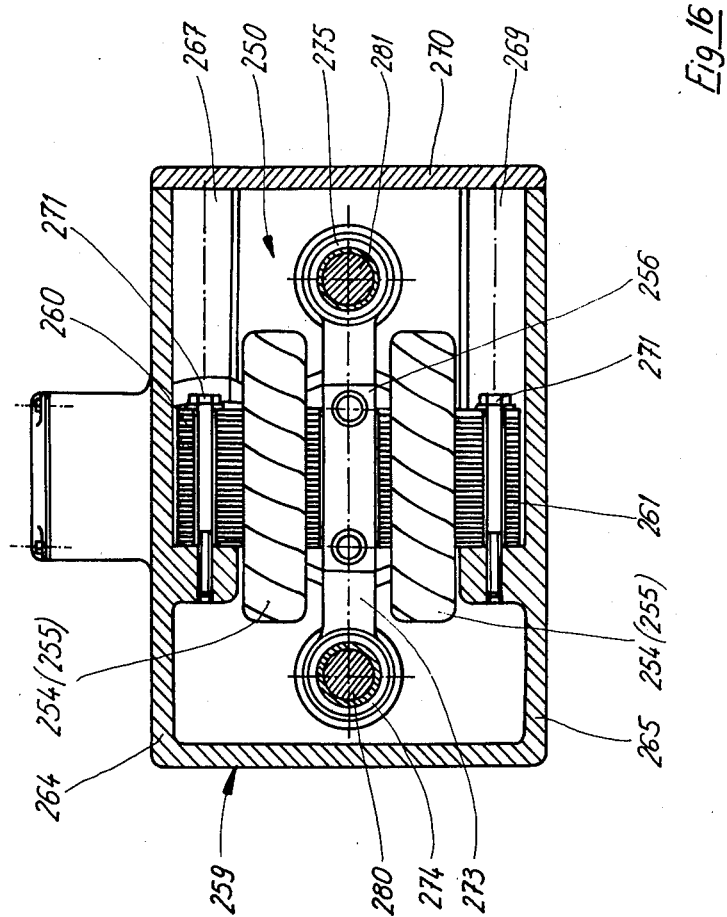
FIG. 16 is a transverse cross-section taken along the line XVI—XVI of FIG. 14.

The embodiment illustrated in FIGS. 14-16 differs essentially from the previously described embodiments.

The transverse field drive 250 of this embodiment is provided with a stator 251 having two pole pairs 252 and 253 each provided with a two-part exciter winding 254, respectively 255, as well as an armature 256 having two magnetically active armature parts 257 and 258. The aforementioned elements are mounted in a housing 259 of rectangular cross-section.

The stator parts 260 and 261 are completely separated from each other by the air gap of the two pole pairs 252 and 253. The two stator parts 260 and 261 are composed of laminations of U-shaped cross-section, as shown in FIG. 14. The two legs of each stator parts 260 and 261 are connected by a straight web and the front edges of the legs of the U-profile are likewise straight and parallel to the web. The relatively short legs of the U-profile of the stator laminations form the individual poles of the pole parts 252 and 253 and the winding parts of the exciter windings 254, respectively 255, are pushed onto the legs. The free distance between the two legs of the U-profile is substantially greater than half of the total stroke of the armature 256 so that the magnetic active part of the armature which cooperates with one pair of poles remains, during the swinging movement of the armature, outside of the field of the other pole part. The magnetic flux passes through the web part of the U-profile of the stator lamination from one to the other pole at one side of the armature and through the air gap to the pole pair on the other side.

As shown in FIG. 14, the laminations of the stator parts 260 and 261 are provided at opposite ends of the web part of the U-shaped profiles thereof with semi-circular projections 262, respectively 263. At the center point of each semi-circular projection there is provided a circular opening in each of these laminations. Two holding strips 266 and 267, respectively 268 and 269 are provided on the horizontal walls 264 and 265 of the housing 259 and these holding strips extend at right angles to the longitudinal direction of the housing 259 and therewith at right angles to the direction movement of the armature 256. As shown in FIG. 16, these holding strips extend at the one side up to the exterior of the housing 259 which, at this one side is closed by a cover 270. The holding strips are provided at the side faces thereof which are directed toward each other with counter profiles matching the projections 261 and 262 of the stator laminations. These profiles extend at the one side, as the holding strips themselves, up to the cover 270. At the other side the last portions of these holding strips are not provided with profiles to form thereby an abutment for the stator laminations. When the cover 270 is removed, the laminations may individually or as complete stack be pushed from the one side of the housing between the holding strips so that the projections at opposite ends of the laminations will engage in the corresponding counter profiles of the holding strips. Screw bolts 271 are then inserted through the openings formed in the projections of the laminations and these screw bolts are then screwed into correspondingly threaded bores in the non-profiled parts of the holding strips, to thereby securely fasten the stator parts 260 and 261 to the housing.

The armature 256 is likewise formed from a plurality of parts as can be especially visualized from FIG. 15. The armature 256 has an armature frame 272 of I-shaped cross-section. The web part 273 of the frame 272 has a rectangular cross-section and the two flange parts 274 and 275 of the armature frame 272 have an annular cross-section, as clearly shown in FIG. 16. These flanged parts 274 and 275 form, outside of the stator 251, parts of a guiding device for the armature 256. Two spacing bodies 276 of rectangular cross-section and formed of non-magnetic and non-conductive material are respectively provided to opposite sides of the web 273 of the armature frame 272. The magnetic active parts 257 and 258, are each formed from a plurality of laminations abutting against the outer surfaces of the spacer bodies 276. A pair of yoke parts 277, likewise formed of non-magnetic and non-conductive material, abut against the outer faces of the magnetic active parts 257 and 258 and these yoke parts 277 have a disk-shaped portion parallel to the web 273 and a central hub portion outwardly projecting therefrom. All elements which are added to opposite sides of the web part 273 of the armature frame 277, as well as the web part itself, are provided with two bores therethrough, which are aligned in these various parts with each other and through which two bolts 278 extend by means of which all these parts are clamped together. The bores through the magnetic active armature parts 257 and 258 have a slightly greater diameter than those extending through the other part, for the reception of insulating sleeves 278. As shown in FIG. 15, the free ends of the flange parts 274 and 275 of the armature frame 272 are provided at the inner peripheral surface thereof with annular cutouts into which outer peripheral portion of the yoke parts 277 engage so that the disk-shaped portions of the yokes 277 are additionally supported.

The guide means for the armature 256 include further two guide rods 280 and 281 of circular cross-section. These guide rods are parallel to each other. The longitudinal axes of the guide rods 280 and 281 are spaced in transverse direction from each other a distance which is equal to the center distance of the two flange parts 274 and 275 of the armature frame 272. The opposite ends of the guide rods 280 and 281 are provided with screw threads and extend respectively through openings in the end wall 282 at the left side of the housing 259, as viewed in FIG. 15, and through openings in the cover 283 at the other end of the housing and are held in fixed position with regard to the housing by nuts screwed on the outer threaded ends thereof. The cover 283 is properly positioned with respect to the housing 259 by a plurality of dowel pins 284, and by screws 279 connected to the housing 259. In the assembled position the two flange parts 274 and 275 of the carrier frame 272 are guided on the guide rods 280, respectively 281.

The two return springs 285 and 286 for the armature 256 are constituted respectively by two coil compression springs 287 and 288, respectively 289 and 290. These coil springs are located at the one hand between the carrier frame 272 and the end wall 282 of the housing 259 and on the other hand between the carrier frame 272 and the cover 283 about the guide rod 280, respectively 281. The ends of the coil compression spring are centralized at the end wall 282 and at the cover 283 by spring washers 291 and at the carrier frame 277 by spring washers 292 with respect to the guide rods 280 and 281.

As can be visualized by FIG. 15, each of the return springs 285 and 286 includes besides the coil copression springs a gas spring 293, respectively 294. These gas springs 293 and 294 are arranged to opposite sides and axially aligned with the armature 256. The gas springs 293 and 294 comprise each a gas spring cylinder 295, respectively 296, and a gas spring piston 297, respectively 298. The gas spring cylinder 295 is integrally formed with the end wall 282 of the housing 285. The gas spring cylinder 296 is integrally formed with the cover 283 of the housing 285. The gas spring cylinders 295 and 296 are respectively closed at the ends thereof facing away from the armature 256 by a cover 299, respectively 300. The movement of the armature 27 is transmitted to the gas spring pistons 297 and 298 by connecting rods 301 and 302. One end of each connecting rod 301 and 302 is during the production of the yoke parts 277 and 288 directly formed into the central projections 303 on the yoke part 277, respectively into the central projection 304 of the yoke part 278. The other ends of the connecting rods 301 and 302 are provided with screw threads and screwed into central corresponding bores of the gas spring piston 297, respectively 298. The two gas spring pistons 297 and 298 are each provided with two piston rings 305.

The swing system composed of the armature 256 and the return springs 285 and 286 with their sets of metal springs is constructed in such a manner that the inherent frequency of the system closely approaches the drive frequency of the transverse field drive 250. To avoid thereby even at unfavorable conditions an overshooting, the two gas springs 293 and 294 are provided to prevent such overshooting. Therefore, a plurality of openings 306 and 307 are provided in the peripheral walls of the gas spring cylinders 295 and 296 in that plane in which these openings are closed by the front edge of the respective gas spring piston 97 or 98, in their reversing point position of the normal stroke of their stroke. In the region of the normal stroke of the gas spring pistons 297 and 298 air will, therefore, be sucked through the openings 306 and 307 into the interior of the gas spring cylinders 295 and 296 and subsequently again expelled. Shortly before the openings 306 and 307 are closed by the piston there will occur a certain braking action. If the gas spring pistons 297 and 298 eventually overshoot beyond their normal reversing position a fast progressing spring action will be produced by the gas springs 293 and 294 to thereby, for instance, prevent abutment of successive windings of the coil compression springs 287 and 288, respectively 289 and 290 upon each other.

The operating condition of the vibrator illustrated in FIGS. 14–16 is substantially equal to that of the other embodiments disclosed.

Since in the last embodiment the magnetic circuit is used twice for forming a pole gap for the armature, the same work is performed by a stroke of half the length as compared to the other embodiments. Due to the planar pole gap surfaces at the pole pairs 252 and 253 of the stator and due to the planar construction of the magnetic active armature parts 257 and 258 considerably smaller distortions of the magnetic field lines will occur at the air gaps, which increases the elecromagnetic efficiency of the transverse field drive. Since the individual laminations of the stator parts 260 and 261 extend parallel to the direction of movement of the armature, the magnetic field passing from the armature into the stator may spread over the whole stator cross-section without being obstructed by the insulation between the laminations, whereby the necessary magnetizing current for the stator is reduced.

Figure 17:
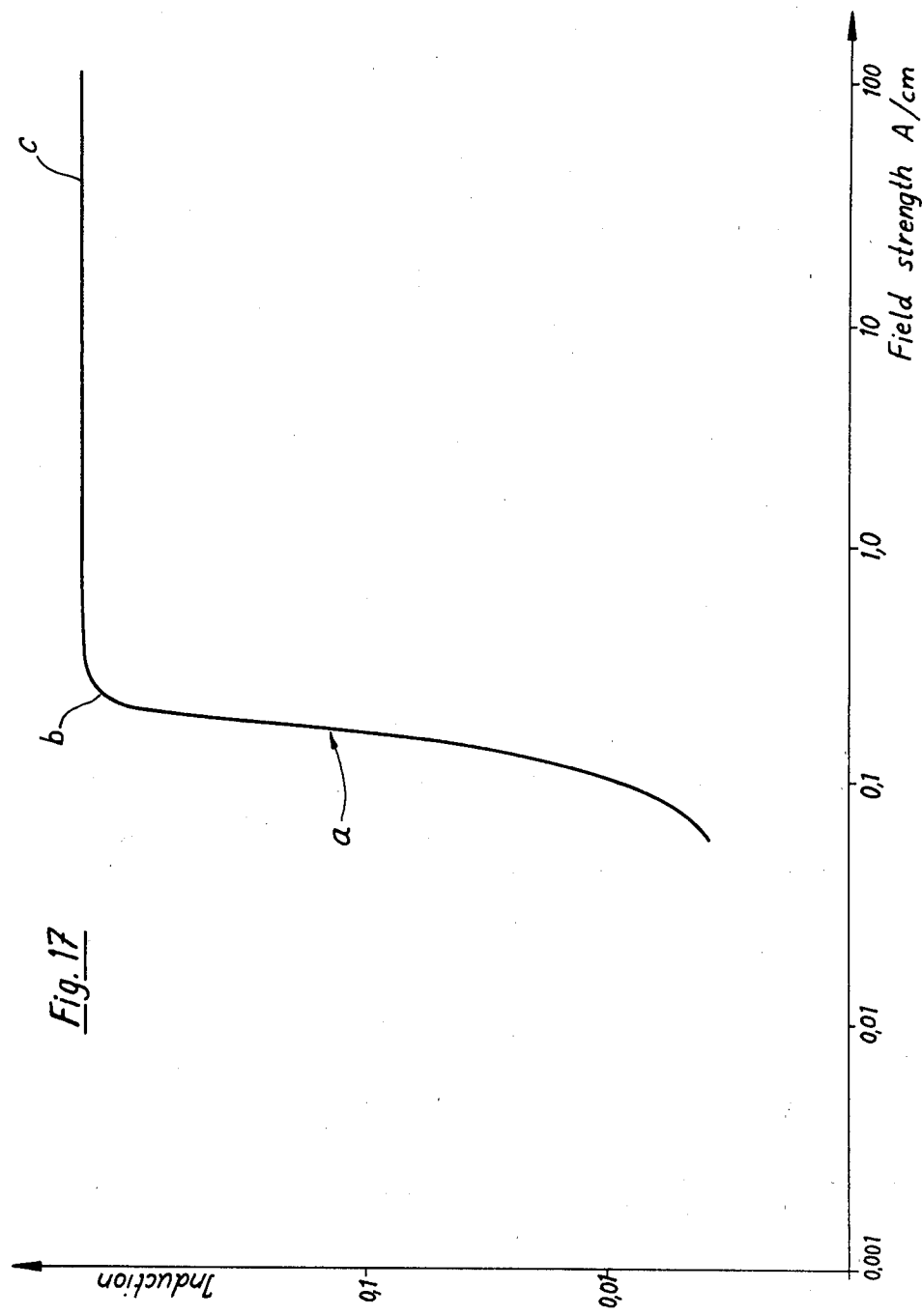
FIG. 17 is a diagram showing the magnetizing curve of the armature laminations.

In all embodiments disclosed, it is especially advantageous and essential for the present invention if the laminations for the armature are formed from a ferritic material having in direction of the flux of the transverse field drive a substantially Z-shaped extending magnetizing curve. Such a material is, for instance, Permenorm 5000Z. It is thereby of advantage when the magnetizing curve of the armature laminations has as shown in FIG. 17 a steep, substantially vertical rise "a" of the induction in the region of zero field intensity, then a curved bend "2" at high saturation induction and a transition to the flat saturation region "c" at magnetic field strength extending beyond zero. It is further advantageous if the stator of the transverse field drive is constructed from laminations which, however, have a flux cross-section which is twice of that of the laminations of the armature.

It will be understood that each of the elements described above, or two or more together, may also find a useful application in other types of linear electromagnetic vibrators, differing from the types described above.

While the invention has been illustrated and described as embodied in a linear electromagnetic vibrator having stator means producing a magnetic field extending in a first direction and an armature guided for linear movement in a direction transverse to the first direction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear electromagnetic vibrator comprising a stator having a pair of spaced poles having parallel planar end faces, said stator being composed of a stack of laminations extending parallel to each other and normal to said end faces of said poles; a winding for said stator producing an energizing magnetic field extending in a first direction normal to said end faces; an armature guided for linear movement in a direction transverse to said first direction to be moved upon excitation of said winding towards a rest position, said armature having opposite parallel faces extending parallel to the direction of movement of said armature and parallel to said end faces of said poles, said armature being composed of a stack of laminations extending parallel to each other and normal to said opposite faces of said armature and normal to the direction of movement of said armature whereas said stator laminations extend parallel to said direction of movement; and a pair of return spring means acting in opposite direction on said armature for exerting at least in the end regions of the movement of the armature a force to said armature in a direction towards the rest position.

2. A linear electromagnetic vibrator as defined in claim 1, wherein the length of the stator in said transverse direction is substantially equal to the length of said armature.

3. A linear electromagnetic vibrator as defined in claim 1, wherein said return spring means comprise metal springs.

4. A linear electromagnetic vibrator as defined in claim 3, wherein said metal springs are coil compression springs.

5. A linear electromagnetic vibrator as defined in claim 4, wherein the length of said coil compression springs is harmonized with the stroke of said armature so that said springs are stressed in each position of said armature.

6. A linear electromagnetic vibrator as defined in claim 3, and including a housing mounting said stator, said housing being provided to opposite sides of said stator with hollow cylindrical guide portions coaxial with each other and the longitudinal axis of said armature, and a guide rod axially movable in said guide portions, said armature being provided with an opening therethrough coaxial with said guide rod and being fixed to the latter for movement therewith.

7. A liner electromagnetic vibrator as defined in claim 1, wherein said return spring means comprise gas springs.

8. A linear electromagnetic vibrator as defined in claim 4, wherein each of said gas springs comprises a cylinder member closed at its outer end and a piston member guided in said cylinder member, one of said members being connected to said armature for movement therewith in said transverse direction.

9. A linear electromagnetic vibrator as defined in claim 8, wherein at least one of said cylinder members is provided in the peripheral wall thereof with at least one opening located in a plane normal to the axis of said cylinder member in which the opening is just closed by the piston when said armature is in its rest position.

10. A linear electromagnetic vibrator as defined in claim 8, wherein at least one of said cylinder members is provided in its peripheral wall with at least one opening located in a plane normal to the cylinder axis and at a point of the latter located between the rest position of the edge of the piston member facing the closed end of the cylinder member and the inner reversing point of said edge spaced further from said closed end than said rest position.

11. A linear electromagnetic vibrator as defined in claim 8, wherein at least one of said cylinder members is provided in a peripheral wall with at least one opening which is located in a plane normal to the cylinder axis and at a point of the latter located between the rest position of the edge of the piston member facing the closed end of the cylinder member and the outer reversing point of said edge adjacent the closed end of the cylinder member.

12. A linear electromagnetic vibrator as defined in claim 11, and including an inwardly opening one-way valve in said opening.

13. A linear electromagnetic vibrator as defined in claim 12, and including a second opening in said peripheral wall and an outwardly opening one-way valve in said second opening.

14. A linear electromagnetic vibrator as defined in claim 13, and including a gas conduit leading from said second opening close to the winding of the stator.

15. A linear electromagnetic vibrator as defined in claim 7, wherein said gas springs are constituted by cylinders connected to said stator and having outer closed ends and pistons in said cylinders and connected to said armature for movement therewith, said cylinders being provided with one-way valves forming with said pistons blower means.

16. A linear electromagnetic vibrator as defined in claim 8, and including a housing in which said stator is mounted, a guide rod connected in stationary position to said housing, said armature being provided with an opening, said guide rod extending with a slide fit through said opening.

17. A linear electromagnetic vibrator as defined in claim 16, wherein said guide rod is formed from non-magnetic maerial and having a circular cross-section, and including a layer of friction reducing material on the inner cylindrical surface of said armature.

18. A linear electromagnetic vibrator as defined in claim 1, wherein said return spring means comprise metal springs and gas springs.

19. A linear electromagnetic vibrator as defined in claim 1, wherein said return spring means are constructed and arranged so that both are stressed to the same degree when said armature is positioned substantially midway between an aligned position of armature and stator and one of the reversing points of said armature.

20. A linear electromagnetic vibrator as defined in claim 1, and including a cylinder connected to said stator and a piston connected to said armature for movement therewith in said direction in said cylinder and forming with the latter a blower, said cylinder being provided with inwardly, respectively outwardly, opening one-way valves.

21. A linear electromagnetic vibrator as defined in claim 1, wherein said laminations in said armature extend normal to the direction of movement of said armature.

22. A linear electromagnetic vibrator as defined in claim 1, wherein said stator has a second pair of poles with their own windings, in which the second pair of poles extends parallel to the first-mentioned pair and are axially spaced therefrom for a distance which is greater than half a stroke of the armature, and wherein the armature has two coaxial armature portions spaced in the direction of movement of the armature from each other through the same distance as said pair of poles.

23. A linear electromagnetic vibrator as defined in claim 22, wherein the axially spaced pair of poles are respectively connected to each other at the sides thereof facing away from said armature.

24. A linear electromagnetic vibrator as defined in claim 23, wherein the stator parts respectively arranged to opposite sides of the armature are each formed from laminations of U-shaped configuration extending parallel to the direction of movement of said armature and connected to each other to form a stack of laminations.

25. A linear electromagnetic vibrator as defined in claim 24, and including a housing surrounding said stator, each of said stator parts having at the side thereof facing away from the armature a planar face and each of said stator parts having a pair of opposite end faces extending transverse to said planar face and said housing having transverse faces interengaging with the transverse end faces of each stator part for holding said stator parts on said housing.

26. A linear electromagnetic vibrator as defined in claim 22, and including a housing surrounding said stator and a pair of guide rods mounted in said housing to opposite sides of said armature, said armature being provided with portions respectively guided on said guide rods.

27. A linear electromagnetic vibrator as defined in claim 26, wherein said armature includes an armature frame of I-shaped cross-section having a central web to opposite sides of which said armature portions are connected and a pair of outer flanges provided with said portions which are guided on said guide rod.

28. A linear electromagnetic vibrator as defined in claim 27, wherein said armature frame comprises additional carrying parts for said armature portion which extend parallel to said central web and which are supported on said outer flanges.

29. A linear electromagnetic vibrator as defined in claim 1, wherein said laminations forming said armature are formed from a material having in the direction of the magnetic field passing through said armature a substantially Z-shaped magnetization curve.

30. A linear electromagnetic vibrator as defined in claim 29, wherein said magnetization curve has a substantially vertical rise of the induction in the region of zero field intensity, then a curved bend at a high saturation induction and a transition into a flat saturation region at a magnetic field strength above zero.

31. A linear electromagnetic vibrator as defined in claim 1, wherein said stator is constructed of laminations which have a flux cross-section which is about twice of that of the laminations of the armature.

* * * * *